US012111594B2

(12) United States Patent
Ashida et al.

(10) Patent No.: US 12,111,594 B2
(45) Date of Patent: Oct. 8, 2024

(54) FIXING DEVICE CAPABLE OF FIXING FRAME COVERING HEATING UNIT

(71) Applicant: CANON KABUSHIKI KAISHA, Tokyo (JP)

(72) Inventors: Taku Ashida, Chiba (JP); Youichi Chikugo, Chiba (JP); Hidekazu Tatezawa, Saitama (JP); Kenichi Tanaka, Ibaraki (JP); Rikiya Takemasa, Chiba (JP); Takeshi Kozuma, Tokyo (JP); Mikihiko Watanabe, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/063,369

(22) Filed: Dec. 8, 2022

(65) Prior Publication Data

US 2023/0221667 A1 Jul. 13, 2023

(30) Foreign Application Priority Data

Jan. 12, 2022 (JP) ................................ 2022-003182

(51) Int. Cl.
*G03G 15/20* (2006.01)

(52) U.S. Cl.
CPC ................................ *G03G 15/2064* (2013.01)

(58) Field of Classification Search
USPC .......................................................... 399/331
See application file for complete search history.

(56) References Cited

U.S. PATENT DOCUMENTS

2003/0185590 A1* 10/2003 Kurisu ............... G03G 15/2028 399/130
2008/0310895 A1* 12/2008 Masuda ............ G03G 15/2064 399/331
2010/0034567 A1* 2/2010 Sone ................. G03G 15/2039 399/328

FOREIGN PATENT DOCUMENTS

JP 2010026375 A * 2/2010
JP 2011-123181 A 6/2011
JP 2013164551 A 8/2013
JP 2021056292 A 4/2021
JP 2021089445 A 6/2021
KR 20050029900 A * 3/2005 ......... G03G 15/2064

* cited by examiner

*Primary Examiner* — Quana Grainger
(74) *Attorney, Agent, or Firm* — Canon U.S.A., Inc. IP Division

(57) ABSTRACT

A fixing device includes a heating unit, a pressure unit, a first frame, an urging member, a support member, and a fixing member. The heating unit heats toner carried by a recording medium. The pressure unit pressurizes the heating unit to form a nip portion with the heating unit and fixes a toner image onto the recording medium at the nip portion with the heating unit. The first frame moves to a first position where the heating unit is exposed and moves to a second position where the heating unit is covered. The urging member urges the heating unit to position the heating unit. The support member supports one end of the urging member and the fixing member fixes the support member to the fixing device.

14 Claims, 5 Drawing Sheets

FIXING DEVICE CAPABLE OF FIXING FRAME COVERING HEATING UNIT

BACKGROUND

Field

The present disclosure relates to a fixing device that fixes a toner image onto a recording medium.

Description of the Related Art

An image forming apparatus includes a fixing device for fixing an unfixed toner image on a recording medium, onto the recording medium.

The fixing device includes a heating unit for heating the unfixed toner image, and a pressure unit that pressurizes the heating unit and forms a nip portion with the heating unit. When the recording medium carrying the unfixed toner image thereon is conveyed to the nip portion, heat and pressure are applied by the heating unit and the pressure unit, and the toner image is fixed onto the recording medium.

Since the heating unit and the pressure unit of the fixing device forms the nip portion, it is necessary to position the heating unit and the pressure unit with high accuracy. Therefore, the image forming apparatus includes a frame covering the fixing device in order to position the heating unit and the pressure unit.

Periodic maintenance work is commonly performed on the fixing device. In the maintenance work, for example, parts of the fixing device are replaced. Thus, to facilitate the replacement of the parts, the fixing device is insertable into and removable from the frame.

A frame discussed in Japanese Patent Application Laid-open No. 2011-123181 includes a frame positioned on the pressure unit side and a frame positioned on the heating unit side. The frame on the heating unit side is openable and closable with respect to the fixing device. Further, a technique for fixing the frame on the heating unit side to the frame on the pressure unit side, and positioning the heating unit at the same time is discussed.

The technique discussed in Japanese Patent Application Laid-open No. 2011-123181 includes a pressing member to position the heating unit in the frame. When the frame on the heating unit side is moved from an opening position to a closing position relative to the fixing device, the pressing member presses the heating unit in a conveyance direction. The frame on the heating unit side and the frame on the pressure unit side are fastened by a fixing member while the pressing member presses the heating unit. As a result, the heating unit is positioned in the conveyance direction.

When the frame on the heating unit side is moved to the closing position, the pressing member urges the heating unit. It is thus necessary to move the frame on the heating unit side while reducing the urging force of the pressing member.

SUMMARY

The present disclosure is directed to a fixing device that enables a heating unit to be easily positioned in a frame and to improving operability when the heating unit is positioned in the frame.

According to an aspect of the present disclosure, a fixing device includes a heating unit configured to heat toner carried by a recording medium, a pressure unit configured to pressurize the heating unit to form a nip portion with the heating unit and configured to fix a toner image onto the recording medium at the nip portion with the heating unit, a first frame configured to move to a first position where the heating unit is exposed and to move to a second position where the heating unit is covered, an urging member configured to urge the heating unit to position the heating unit, a support member configured to support one end of the urging member, and a fixing member configured to fix the support member to the fixing device.

Further features of the present disclosure will become apparent from the following description of exemplary embodiments with reference to the attached drawings.

DESCRIPTION OF THE EMBODIMENTS

A configuration for embodying an image forming apparatus according to an exemplary embodiment of the present disclosure is described below with reference to drawings. In the following, an example in which the present disclosure is applied to an electrophotographic full-color image forming apparatus including a plurality of photosensitive drums is described; however, the present disclosure is not limited thereto and is applicable to a monochrome image forming apparatus and the like.

Image Forming Apparatus

A schematic configuration of an image forming apparatus 1 according to the present exemplary embodiment is described with reference to FIG. 1.

Figure 1:
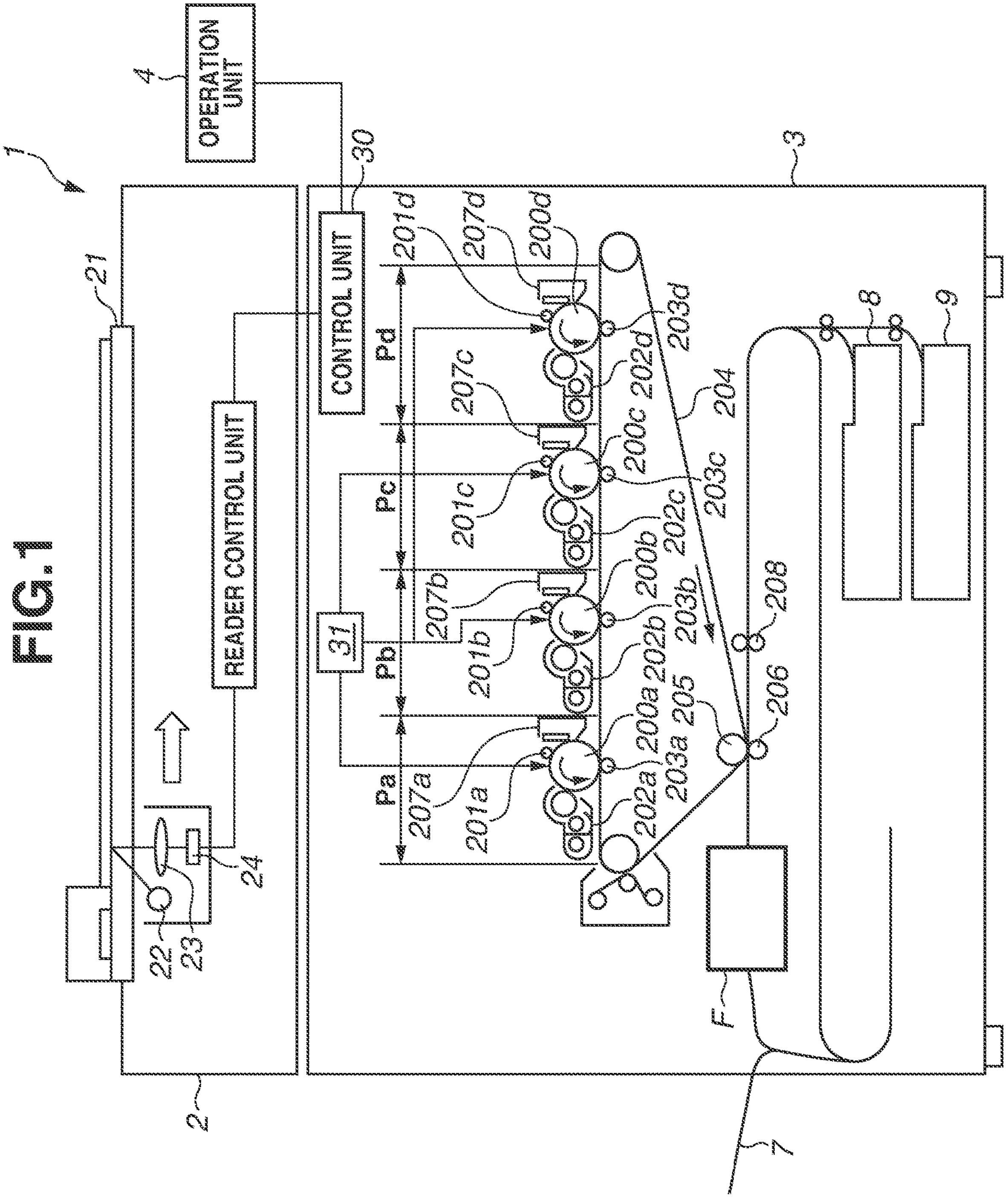
FIG. 1 is a schematic diagram illustrating a cross-section of an image forming apparatus according to an exemplary embodiment.

FIG. 1 is a diagram illustrating a full-color image forming apparatus according to the present exemplary embodiment. The image forming apparatus 1 includes an image reading unit 2, an image forming apparatus main body 3, and an operation unit 4. The image reading unit 2 reads a document placed on a platen glass 21. Light emitted from a light source 22 is reflected by the document, and the reflected light forms an image on a charge coupled device (CCD) sensor 24 through an optical system member 23 such as a lens. Such an optical system unit converts the document into an electric signal data row for each line by performing scanning in a direction of a white arrow on the upper part in FIG. 1. An image signal obtained by the CCD sensor 24 is transmitted to the image forming apparatus main body 3, and a control unit 30 executes image processing corresponding to each image forming unit described below on the image signal. The control unit 30 also receives an external input as the image signal from an external host apparatus such as a print server.

The image forming apparatus main body 3 includes four types of image forming units that are a yellow image forming unit Pa, a magenta image forming unit Pb, a cyan image forming unit Pc, and a black image forming unit Pd arranged along a moving direction of an intermediate transfer belt 204. First, a process of forming a toner image on the intermediate transfer belt 204 is described by using the yellow image forming unit Pa as an example.

In FIG. 1, a surface of a rotationally driven photosensitive drum 200*a* is uniformly charged by a charger 201*a* (charging). Thereafter, an exposure device 31 irradiates the surface of the photosensitive drum 200*a* with a laser based on input image data, thereby forming an electrostatic latent image on the surface of the photosensitive drum 200*a* (exposure). Thereafter, a developing device 202*a* forms a yellow toner image on the photosensitive drum 200*a*. A primary transfer roller 203*a* applies a voltage of a polarity opposite to a potential polarity of the yellow toner image, to the intermediate transfer belt 204. As a result, the yellow toner image on the photosensitive drum 200*a* is transferred to the intermediate transfer belt 204 (primary transfer). The yellow toner remaining on the surface of the photosensitive drum 200*a* without being transferred is scraped by a toner cleaner 207*a*, and is removed from the surface of the photosensitive drum 200*a*. The series of processes is performed in a similar manner in each of the magenta image forming unit Pb, the cyan image forming unit Pc, and the black image forming unit Pd. As a result, a full-color toner image is formed on the intermediate transfer belt 204.

The toner image on the intermediate transfer belt 204 is conveyed to a secondary transfer portion formed by a pair of secondary transfer rollers 205 and 206. A recording medium is taken out one by one from a recording medium cassette 8 or 9 and is fed to the secondary transfer portion in synchronization with a conveyance timing of the toner image. As a result, the toner image on the intermediate transfer belt 204 is transferred to the recording medium (secondary transfer).

The recording medium to which the toner image has been transferred is conveyed to a fixing device F, and is fixed by the fixing device F with heat and pressure (fixing). The recording medium on which the toner image has been fixed is discharged to a sheet discharge tray 7.

The image forming apparatus 1 can also perform monochrome image formation. During the monochrome image formation, only the black image forming unit Pd is driven among the plurality of image forming units.

In a case where images are formed on both surfaces of the recording medium, after transfer and fixing of the toner on a first image formation surface (first surface) are completed, front and rear surfaces of the recording medium are reversed by a reversing unit provided inside the image forming apparatus. Thereafter, a roller 208 conveys the recording medium such that transfer and fixing of toner are performed on a second image formation surface (second surface), and the recording medium is discharged to the outside of the image forming apparatus 1 and is stacked on the sheet discharge tray 7.

The process from charging to discharge of the recording medium on which the toner image has been fixed, to the sheet discharge tray 7 is regarded as image forming processing (print job). Further, a period when the image formation is performed is regarded as an execution period of the image forming processing (execution period of print job).

Fixing Device

Figure 2:
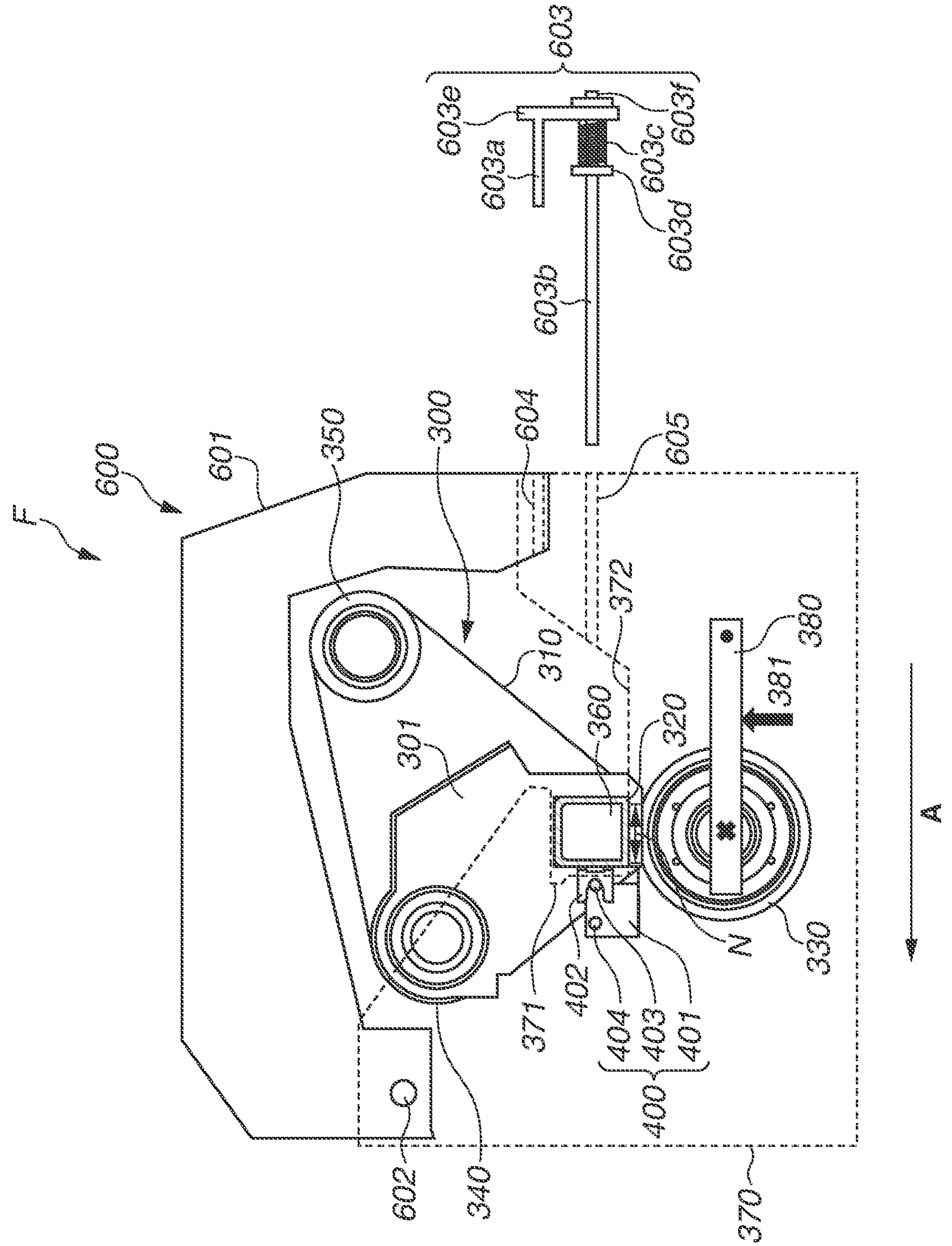
FIG. 2 is a schematic diagram illustrating a fixing device with a heating unit attached according to the present exemplary embodiment.

FIG. 2 is a schematic diagram of an entire configuration of the fixing device F of a belt heating type according to the present exemplary embodiment. The recording medium is conveyed in a direction of an arrow A (hereinafter, conveyance direction A) illustrated in FIG. 2. The fixing device F includes a heating unit 300 applying heat to the recording medium, and a pressure unit that pressurizes the heating unit 300 and forms a nip portion N with the heating unit 300. The heating unit 300 includes a rotatable endless fixing belt (hereinafter, belt) 310. The heating unit 300 includes a pad member (hereinafter, pad) 320, a heating roller 340 including a heat source, and a steering roller 350 adjusting a position of the belt 310 in a width direction of the belt 310, on an inner peripheral surface of the belt 310. The fixing device F further includes a first frame 600 including a cover 601 that covers an upper side of the heating unit 300 in a vertical direction thereof.

The pressure unit according to the present exemplary embodiment serves as a pressure roller 330 that is a pressure rotating member (hereinafter, pressure rotating member 330). The belt 310 of the heating unit 300 and the pressure rotating member 330 of the pressure unit form the nip portion N. The pressure rotating member 330 pressurizes the belt 310. In a direction in which the pressure rotating member 330 pressurizes the belt 310, the pad 320 and a stay 360 are disposed across the belt 310 from the pressure rotating member 330. The stay 360 supports the pad 320 so as to support pressurizing force of the pressure rotating member 330 pressurizing the belt 310. In the width direction of the belt 310, each of the pad 320, the stay 360, and the heating roller 340 is supported by a side plate 301 such that both ends thereof are supported. The belt 310 is stretched due to each of the pad 320, the stay 360, and the heating roller 340 being supported by the side plate 301.

Further, the pressure rotating member 330 is connected to a driving motor, and is rotated to convey the recording medium in the conveyance direction A. Accordingly, the belt 310 held between the pressure rotating member 330 and the pad 320 is rotated following the rotational driving of the pressure rotating member 330. Large force is applied to the belt 310 by the pressure rotating member 330. Thus, a lubricant is applied to the inner peripheral surface of the belt 310, and a sliding sheet is interposed between the belt 310 and the pad 320. This enables the belt 310 to smoothly slide on the pad 320.

The belt 310 has heat conductivity, heat resistance, and the like, and is formed in a thin-walled cylindrical shape. In the present exemplary embodiment, the belt 310 has a three-layer structure including a base layer, an elastic layer on an outer periphery of the base layer, and a releasable layer on an outer periphery of the elastic layer. The base layer has a thickness of 30 micrometers (μm) and is made of a polyimide resin (PI resin), the elastic layer has a thickness of 300 μm and is made of a silicone rubber, and the releasable layer has a thickness of 30 μm and is made of perfluoroalkoxy alkane (PFA) as a fluorine resin.

The heating roller 340 is a stainless pipe having a thickness of 1 millimeter (mm), and a halogen heater as the heat source is disposed inside the heating roller 340 and can generate heat up to a predetermined temperature. The belt 310 is heated by the heating roller 340, and the temperature of the belt 310 is controlled to a predetermined target temperature depending on a paper type, based on temperature detection by a thermistor. Further, a gear is fixed to one end of a shaft of the heating roller 340. The heating roller 340 is connected to a driving motor via the gear, and is rotationally driven by the driving motor via the gear. The belt 310 is rotated following the rotation of the heating roller 340.

The steering roller 350 has a rotational center at one end or near a center, generates tension difference between the front and the rear by rotating relative to the belt 310, and controls the position of the belt 310 in the width direction. The steering roller 350 also serves as a tension roller applying predetermined tension to the belt 310.

The pad 320 is made of a liquid crystal polymer (LCP), and is supported by the stay 360 serving as a pressure member. The stay 360 is made of stainless steel, and both ends of the stay 360 are supported by a housing (hereinafter, second frame) 370 of the fixing device F.

The second frame 370 includes a positioning portion 371 that comes into contact with both ends of the stay 360 in the width direction, a guide portion 372 guiding the heating unit 300, and a pressure support portion 380 supporting both ends of the pressure rotating member 330. When the pressure support portion 380 is moved in a direction of an arrow 381 illustrated in FIG. 2 by a driving source and a cam, the pressure rotating member 330 pressurizes the belt 310 to form the nip portion N there between. When the pressure support portion 380 is moved in a direction opposite to the direction of the arrow 381, the pressure rotating member 330 is separated from the belt 310.

The pressure rotating member 330 is a roller including an elastic layer on an outer periphery of a shaft and a releasable layer on an outer periphery of the elastic layer. The shaft is made of stainless steel, the elastic layer has a thickness of 3 mm and is made of a conductive silicone rubber, and the releasable layer has a thickness of 30 μm and is made of PFA as a fluorine resin. The shaft of the pressure rotating member 330 is supported by the pressure support portion 380 of the fixing device F, a gear is fixed to one end of the pressure rotating member 330, and the pressure rotating member 330 is connected to the driving source via the gear and is rotationally driven by the driving source via the gear. Further, the pressure rotating member 330 is axially supported by the second frame 370.

With the above-described configuration, at the nip portion N formed between the belt 310 and the pressure rotating member 330, heat and pressure for fixing are applied to the toner image while the recording medium carrying the toner image thereon is held and conveyed. As a result, the toner image is fixed onto the recording medium.

In a case where the toner image is fixed onto the recording medium, there may be a case where the recording medium is not separated from the belt 310 at an exit of the nip portion N, and is conveyed to a downstream side of the nip portion N in the rotation direction. In this case, the recording medium stays in the fixing device F, which causes a jam.

The fixing device F includes the heat source. If the jam occurs inside the fixing device F, a jam damages the other members. Therefore, it is desirable to prevent a jam. In the present exemplary embodiment, a separation member 400 is provided in order to prevent a jam. The separation member 400 is disposed inside the second frame 370 in the width direction of the belt 310. The separation member 400 includes a separation plate 401, separation plate guide shafts 403, and separation rotary shafts 404. The separation plate 401 is a metal plate to which a fluorine tape is attached to prevent toner adhesion, an image flaw, and the like. The separation plate guide shafts 403 are disposed on side surface portions on the front side and rear side of the separation plate 401, and axially support the separation plate 401. The separation rotary shafts 404 are disposed on the side surface portions on the front side and the rear side of the separation plate 401, and axially support the separation plate 401, as with the separation plate guide shafts 403.

The separation plate 401 according to the present exemplary embodiment is disposed so as not to come into contact with the belt 310. The separation plate 401 is disposed on the downstream side (i.e., the exit) of the nip portion N, and can separate the recording medium from the belt 310 by coming into contact with a surface where the recording medium discharged from the nip portion N is in contact with the belt 310, of.

The stay 360 is provided with a separation plate regulation member 402 positioning the separation member 400. The separation plate guide shafts 403 of the separation member 400 engage with the separation plate regulation member 402 provided in the stay 360, thereby determining the position of the separation member 400 relative to the belt 310. More specifically, when the separation plate guide shafts 403 are pressed against an engagement portion of the separation plate regulation member 402 in a state where the separation plate 401 is held so as to be swingable around the separation rotary shafts 404, the separation plate 401 engages with the engagement portion of the separation plate regulation member 402, and an attitude thereof is determined. This enables the positions of the separation member 400 and the stay 360 to be determined. As described above, the separation member 400 is disposed at the determined position relative to the stay 360, which enables the belt 310 and the separation plate 401 to maintain a predetermined space therebetween. In the present exemplary embodiment, the separation plate 401 is configured not to be in contact with the belt 310; however, the configuration is not limited thereto, and the belt 310 and the separation plate 401 may come into contact with each other. However, a service life of the belt 310 can be prolonged in the case of the non-contact configuration as compared with the contact configuration. Therefore, in the present exemplary embodiment, the non-contact separation plate 401 is adopted.

Frame

Since the heating unit 300 includes the heat source, an atmospheric temperature near the heating unit 300 rises. Thus, it is necessary to protect members around the heating unit 300 from the heat. Accordingly, the fixing device F according to the present exemplary embodiment includes the first frame 600 including the cover 601 covering the heating unit 300. On the other hand, the fixing device F includes the second frame 370 that supports the both ends of the stay 360 and also supports the pressure rotating member 330 in the width direction of the recording medium.

Figure 3:
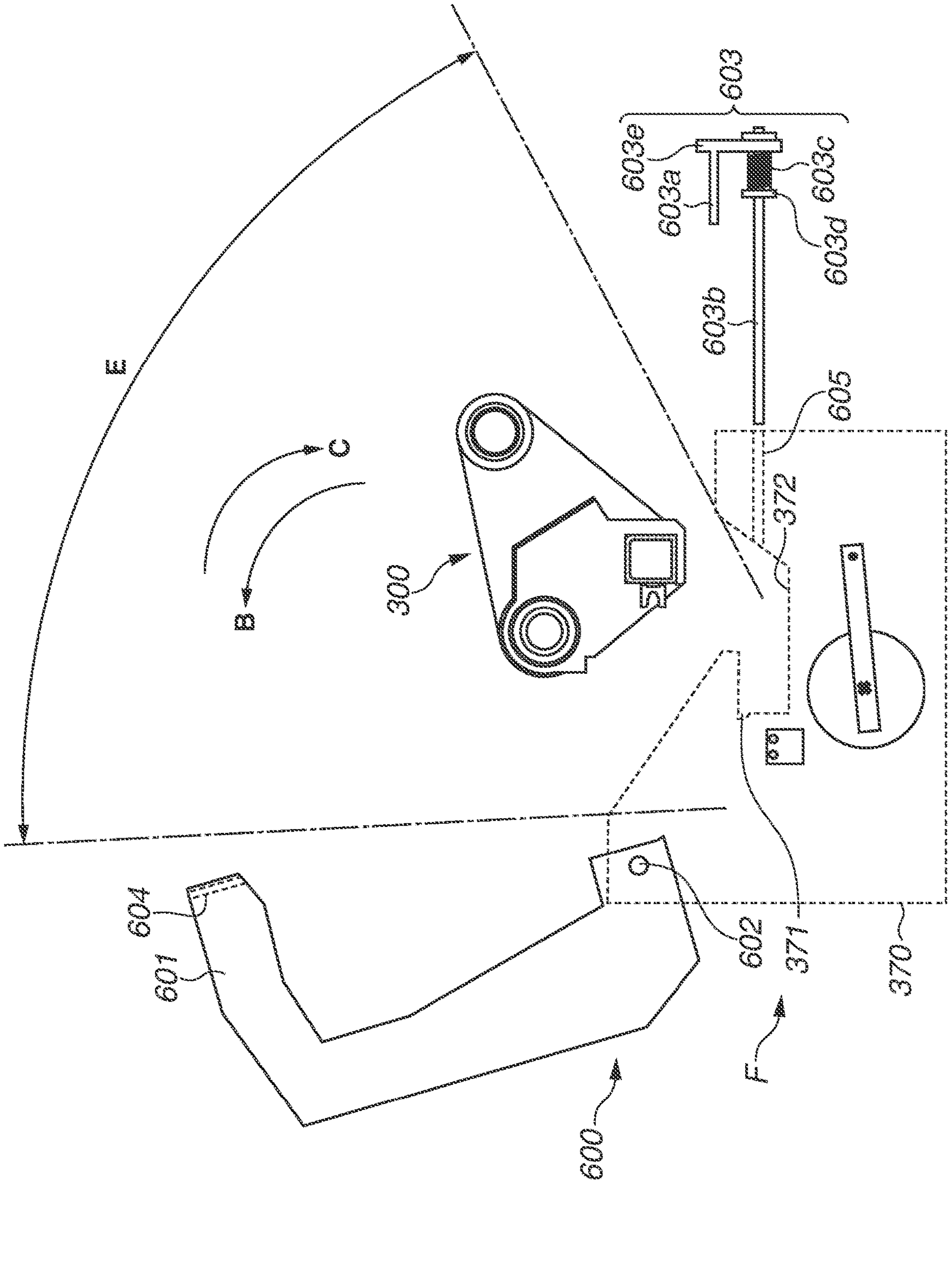
FIG. 3 is a schematic diagram illustrating insertion/removal of the heating unit in the fixing device according to the present exemplary embodiment.

The first frame 600 is axially supported by the second frame 370 so as to be rotatable about a rotary shaft 602. As illustrated in FIG. 3, the first frame 600 is movable to a first position where an upper side of the heating unit 300 in the vertical direction is exposed such that the heating unit 300 is insertable/removable, and is movable to a second position where the upper side of the heating unit 300 in the vertical direction is covered as illustrated in FIG. 2. When the heating unit 300 is insertable into or removable from the second frame 370, the first frame 600 can be regarded as being at the first position. In a case where the first frame 600 is moved to the first position or the second position, the first frame 600 respectively turns in a direction of an arrow B or C illustrated in FIG. 4 around the rotary shaft 602.

Conventionally periodic maintenance work is commonly performed on the image forming apparatus 1. The maintenance work is, for example, part replacement. The maintenance work is mainly performed by a service engineer. During the maintenance of the fixing device F, parts such as the belt 310 are also periodically replaced.

In the case where the maintenance for the fixing device F is performed, the heating unit 300 is normally detached from the first frame 600 and the second frame 370, and is attached thereto after the maintenance work ends. Thus, the work of detaching the heating unit 300 from the first frame 600 and the second frame 370 and the work of attaching the heating unit 300 thereto are desirably easily performable. In particular, since the heating unit 300 is included in forming the nip portion N, the work of attaching the heating unit 300 is desirably more easily performable.

To attach the heating unit 300, it is necessary to place the heating unit 300 on the second frame 370, to move the first frame 600 from the first position to the second position, and to position the heating unit 300 so as not to be shifted in the conveyance direction A. To position the heating unit 300, a pressing member (pressing member 603) including a compression spring is used. The pressing member presses the heating unit 300 in the conveyance direction A to position the heating unit 300. In a case where the first frame 600 is moved to the second position, urging force by the pressing member is generated in the existing technique. Therefore, the heating unit 300 is positioned while suppressing the urging force by the pressing member. Thus, it has been necessary to improve workability in positioning the heating unit 300.

The fixing device F according to present exemplary embodiment is thus directed to improvement in workability in positioning the heating unit 300. The details thereof are described below.

Pressing Member

The fixing device F according to the present exemplary embodiment includes the pressing member 603 pressing the heating unit 300, and a penetration member 603*a* to fix the first frame 600 and the second frame 370. The pressing member 603 includes a contact portion 603*b* (urging member) as a portion coming into contact with the stay 360, and a spring 603*c* to urge the heating unit 300 in the conveyance direction A in a state where the contact portion 603*b* is in contact with the stay 360. The pressing member 603 further includes a first stopper 603*d* coming into contact with a downstream end of the spring 603*c* in the conveyance direction A, and a second stopper 603*e* (support member) coming into contact with an upstream end of the spring 603*c*. The penetration member 603*a* according to the present exemplary embodiment is integrally formed with the second stopper 603*e*. Thus, the pressing member 603 and the penetration member 603*a* are integrated together as a single member. However, the pressing member 603 and the penetration member 603*a* may be separate members. The penetration member 603*a* is fixed to the second stopper 603*e* in the axial direction. In contrast, the contact portion 603*b* is not fixed to the second stopper 603*e* in the axial direction. Further, the first stopper 603*d* is fixed to the contact portion 603*b*. The second stopper 603*e* is not fixed to the contact portion 603*b*. Thus, when the pressing member 603 is urged in the direction of the arrow A, which is the conveyance direction A of the recording material illustrated in FIG. 2, the second stopper 603*e* pushes the spring 603*c*. When force greater than or equal to predetermined force is applied to the spring 603*c*, the spring 603*c* is compressed.

Figure 5:
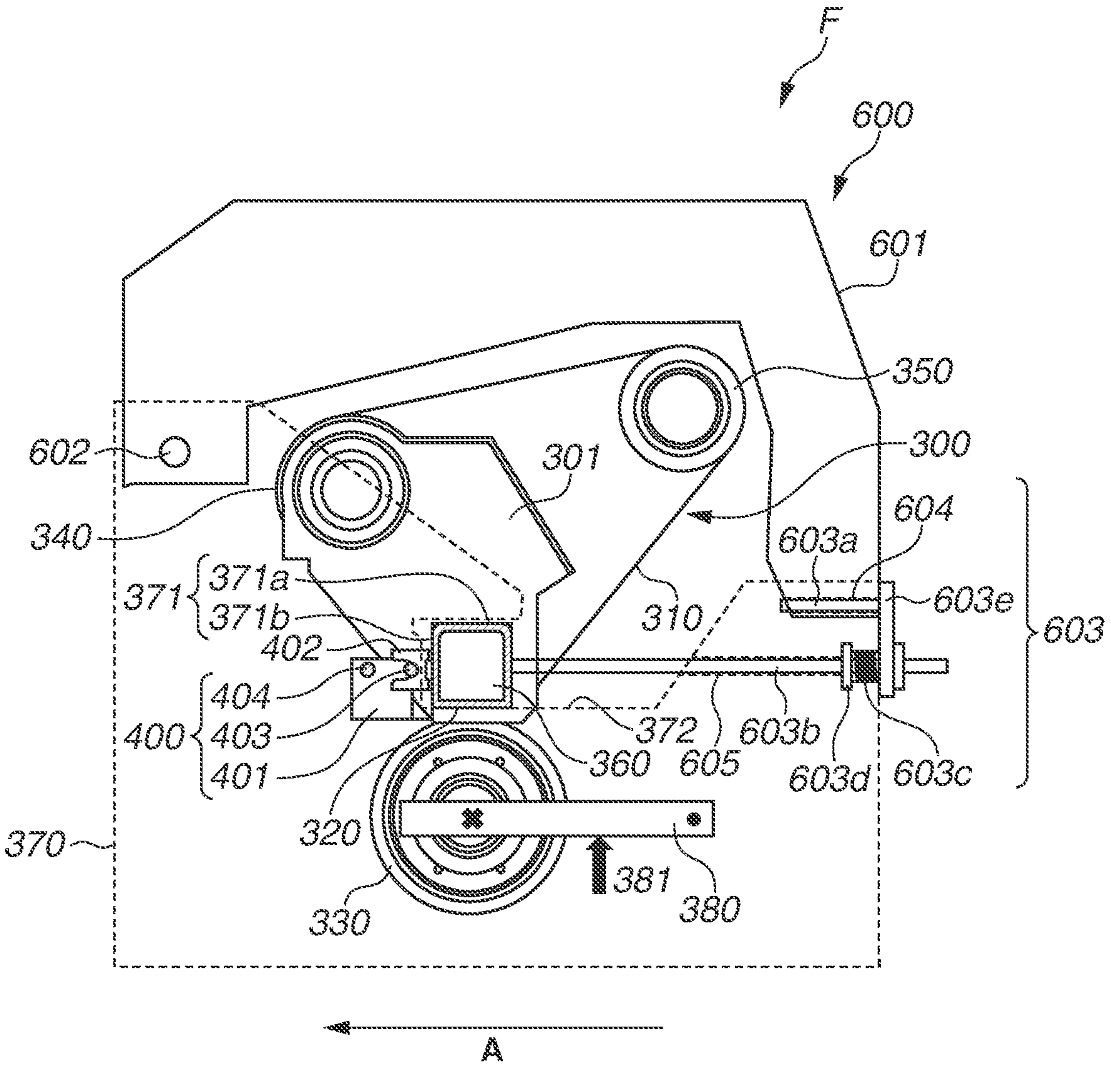
FIG. 5 is a schematic diagram illustrating a state where the heating unit is positioned in the fixing device according to the present exemplary embodiment.

Each of the first frame 600 and the second frame 370 is provided with a hole. The first frame 600 is provided with a first hole, and the second frame 370 is provided with a second hole. In a state where the first frame 600 is at the second position, the hole of the first frame 600 and the hole of the second frame 370 are positioned to face each other. As a result, an opening 604 is formed. When the penetration member 603*a* is inserted into the opening 604, the first frame 600 and the second frame 370 are fixed. Further, the second frame 370 includes a third hole 605 that is another hole different from the hole forming the opening 604. The contact portion 603*b* is insertable into the third hole 605. When the contact portion 603*b* is inserted into the third hole 605, a front end of the contact portion 603*b* abuts on the stay 360 of the heating unit 300. A position where the front end of the contact portion 603*b* abuts on the stay 360 is referred to as a pressing position. A position where the front end of the contact portion 603*b* does not abut on the stay 360 is referred to as a separated position. When the stay 360 is slid on the guide portion 372 in the conveyance direction A while the pressing position is maintained, the stay 360 abuts on the positioning portion 371. In a state where the stay 360 and the contact portion 603*b* abut on each other, and the stay 360 and the positioning portion 371 are accordingly in contact with each other, the spring 603*c* is compressed and has a shorter length than its natural length. The heating unit 300 is urged to the positioning portion 371 by the urging force of the spring 603*c*, thereby positioning the heating unit 300. At this time, the contact portion 603*b* is not fixed to the second stopper 603*e* in the axial direction. Therefore, as compared with a case where the length of the spring 603*c* is the natural length, an upstream end in the conveyance direction A of the contact portion 603*b* protrudes from the second stopper 603*e* toward the upstream side in the conveyance direction A (FIG. 5). In the present exemplary embodiment, the pressing member 603 is movable to the pressing position and the separated position in the state where the first frame 600 is at the second position.

In the present exemplary embodiment, a contact position where the front end of the contact portion 603*b* and the stay 360 are in contact with each other is outside a conveyance area of the recording medium in the width direction of the belt 310.

Attachment of Heating Unit

Next, operation of attaching the heating unit 300 to the fixing device F according to the present exemplary embodiment is described with reference to FIGS. 2 to 5.

Figure 4:
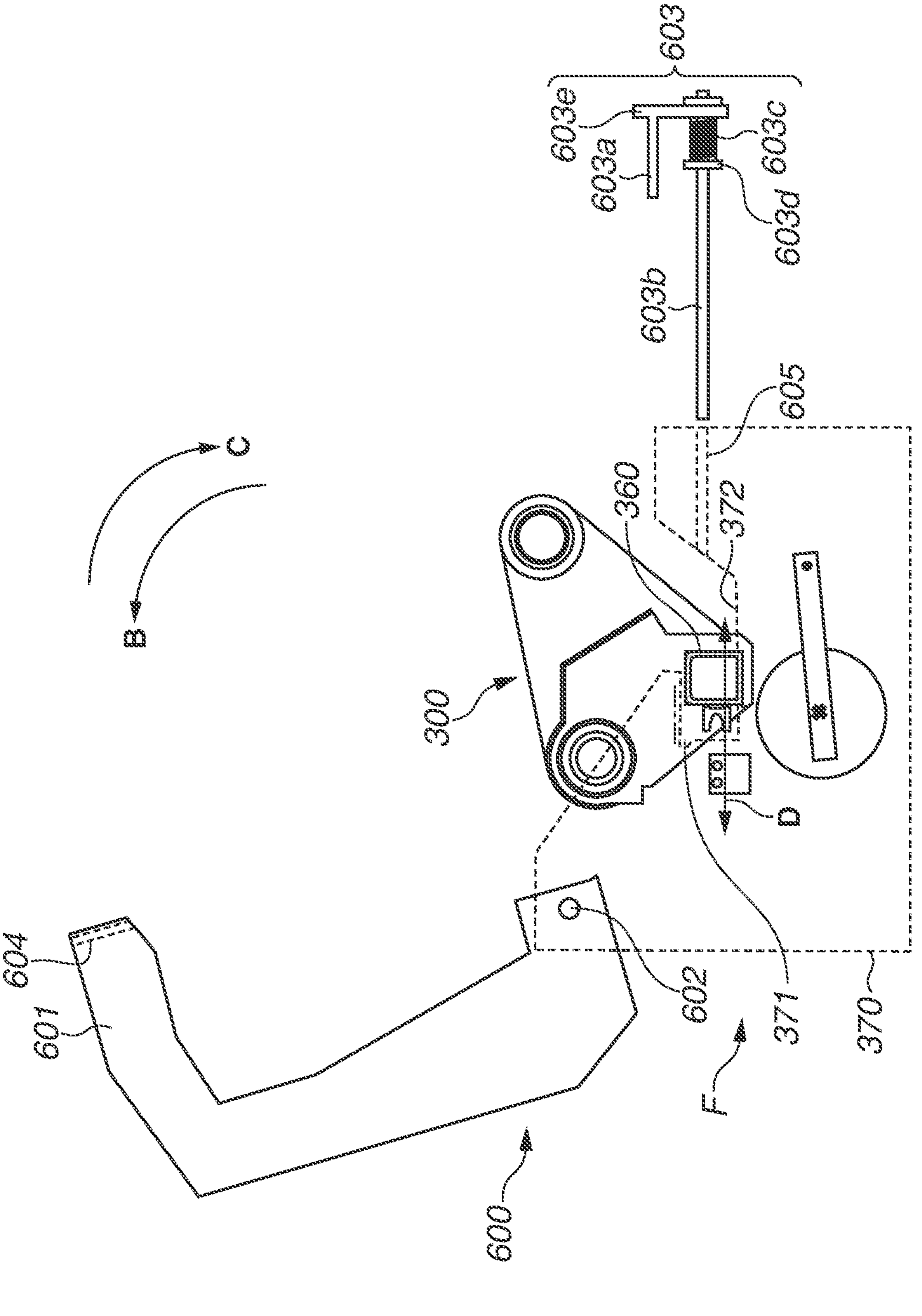
FIG. 4 is a schematic diagram illustrating insertion/removal of the heating unit in the fixing device according to the present exemplary embodiment.

FIG. 2 is a schematic diagram illustrating the entire configuration of the fixing device F of the belt heating type according to the present exemplary embodiment. FIG. 3 is a diagram illustrating a case where the heating unit 300 is inserted into or removed from the first frame 600 and the second frame 370. FIG. 4 is a diagram illustrating a case where the heating unit 300 is placed on the second frame 370, and the first frame 600 is at the first position. FIG. 5 is a diagram illustrating a case where the first frame 600 is at the second position, and the heating unit 300 is positioned.

When the heating unit 300 is attached, the first frame 600 stands by at the first position as illustrated in FIG. 3. The heating unit 300 is then placed on the guide portion 372.

Next, as illustrated in FIG. 4, in a state where the heating unit 300 is on the guide portion 372, the heating unit 300 is moved in the conveyance direction A along an insertion/removal direction D relative to the first frame 600. As a result, the separation rotary shafts 404 of the separation member 400 engage with the separation plate regulation member 402, and the positions of the heating unit 300 and the separation member 400 are determined. In this state, the first frame 600 is rotated in a clockwise direction on the drawing sheet (direction of arrow C illustrated in FIG. 4). As a result, the first frame 600 is completely moved to the second position illustrated in FIG. 2. In the case where the first frame 600 is at the second position, the first frame is desirably maintained at the second position by its own weight of the first frame 600. This makes it possible to reduce necessity to apply force to maintain the first frame 600 at the second position after the first frame 600 is moved to the second position.

Thereafter, when the penetration member 603*a* is inserted into the opening 604 and the contact portion 603*b* is inserted into the third hole 605 in the state where the first frame 600 is at the second position as illustrated in FIG. 5, the first frame 600 and the second frame 370 are fixed. Further, when the pressing member 603 is inserted deeper, the front end of the contact portion 603*b* abuts on the stay 360 of the heating unit 300. When the stay 360 is slid on the guide portion 372 in the conveyance direction A, the stay 360 abuts on the positioning portion 371. As a result, since the stay 360 is urged by the spring 603*c*, the heating unit 300 is positioned in the conveyance direction A. The pressing member 603 and the second frame 370 are fixed with a screw or the like while the stay 360 abuts on the positioning portion 371.

Detachment of Heating Unit

Next, operation of detaching the heating unit 300 from the fixing device F according to the present exemplary embodiment is described with reference to FIGS. 3, 4, and 5.

The maintenance work is normally performed when image formation is not performed. Thus, the heating unit 300 is detached in a state where the pressure rotating member 330 is separated from the belt 310. As illustrated in FIG. 5, the first frame 600 and the second frame 370 are fixed by the penetration member 603*a*, and the heating unit 300 is positioned.

Next, the pressing member 603 is pull out from the opening 604 and the third hole 605 as illustrated in FIG. 4. This enables the first frame 600 to move to the first position, and enables the heating unit 300 to move in the insertion/removal direction D. When the first frame 600 is rotated in a counterclockwise direction (direction of arrow B illustrated in FIG. 4) in this state, the first frame 600 is moved to the first position. Further, to detach the heating unit 300 from the positioning portion 371, the heating unit 300 is moved on the guide portion 372 in a direction opposite to the direction of arrow A shown in FIG. 2. As a result, the separation plate regulation member 402 and the separation plate guide shafts 403 disengage from each other. Accordingly, the heating unit 300 can be detached from the fixing device F as illustrated in FIG. 3.

The fixing device F according to the present exemplary embodiment includes the spring 603*c* to position the heating unit 300 in the conveyance direction A. The spring 603*c* and the first frame 600 are separately provided as different members. Further, in the case where the first frame 600 is at the second position, the pressing member 603 is movable to the pressing position where the pressing member 603 presses the stay 360 to position the heating unit 300, and is movable to the separated position where the pressing member 603 is separated from the stay 360. Thus, when the first frame 600 is moved to the second position, it is unnecessary to suppress the urging force of the spring 603*c*. Accordingly, the heating unit 300 can be easily positioned.

Further, as illustrated in FIG. 4, when the first frame 600 is moved from the second position to the first position, the first frame 600 is rotated in the conveyance direction A. The first frame 600 is then maintained at the first position by the own weight of the first frame 600. On the other hand, when the heating unit 300 is detached from the second frame 370, the heating unit 300 is slid in the direction opposite to the conveyance direction A and detached. In other words, the rotating direction of the first frame 600 when the first frame 600 is moved to the first position is opposite to the detachment direction of the heating unit 300. Thus, the first frame 600 hardly inhibits the movement line of the service engineer in the work space where the service engineer attaches or detaches the heating unit 300 thereto/therefrom. This enables the service engineer to perform the service in a natural attitude.

In the present exemplary embodiment, the pressing member 603 and the penetration member 603*a* are integrated.

The configuration in which the pressing member 603 and the penetration member 603*a* are integrated can reduce the number of parts, and also can improve workability in attachment and detachment of the heating unit 300. Further, positioning of the heating unit 300 by the pressing member 603 and fixation of the first frame 600 and the second frame 370 by the penetration member 603*a* can be performed in the same direction. This also makes it possible to improve the workability.

After the heating unit 300 is positioned by the pressing member 603, the pressing member 603 is fixed to the second frame 370 with a fixing member 603*f* such as a screw. In the present exemplary embodiment, the insertion direction of the fixing member 603*f* is identical to the direction in which the spring 603*c* urges the heating unit 300. In a case where these two directions are not identical to each other, it is necessary to apply force in different directions in order to suppress the urging force of the spring 603*c* and to insert the screw or the like. According to the present exemplary embodiment, applying force in the same direction can fix the pressing member 603 to the second frame 370. This also makes it possible to improve the workability.

In the case where the first frame 600 is moved to the second position, the first frame 600 is maintained at the second position by the own weight of the first frame 600. In the case where the first frame 600 is at the second position, the heating unit 300 is positioned. Thus, since the first frame 600 is maintained at the second position by the own weight of the first frame 600, it is possible to reduce necessity to adjust the position of the first frame 600.

In the present exemplary embodiment, the configuration in which the belt is used as the heating unit 300 is described; however, the heating unit 300 may have a roller shape, and similar effects are achievable as long as the heating unit 300 is set in the recording medium conveyance direction A. Further, similar effects are achievable when the heat source for heating the heating unit 300 heats the heating unit 300 from the outside of the heating unit 300. The stay 360 is illustrated in a prismatic shape; however, the stay 360 may have a roller shape, and similar effects are achievable as long as the stay 360 abuts on the heating unit 300 in the conveyance direction A.

The fixing device according to the present disclosure makes it possible to easily attach a heating unit to a frame.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-003182, filed Jan. 12, 2022, which is hereby incorporated by reference herein in its entirety.

What is claimed is:

1. A fixing device comprising:

a heating unit configured to heat toner carried by a recording medium;

a pressure unit configured to pressurize the heating unit to form a nip portion with the heating unit and configured to fix a toner image onto the recording medium at the nip portion with the heating unit;

a first frame configured to move to a first position where the heating unit is exposed and to move to a second position where the heating unit is covered;

a second frame configured to rotatably support the pressure unit;

an urging member configured to urge the heating unit to position the heating unit;

a support member configured to support one end of the urging member; and a fixing member configured to fix the support member to the fixing device;

wherein the urging member urges the heating unit when the fixing member fixes the support member to the fixing device, and wherein the first frame is fixed to the second frame by the fixing member fixing the support member after the first frame is moved from the first position to the second position.

2. The fixing device according to claim 1, wherein the first frame is movable to the first position and the second position by rotating.

3. The fixing device according to claim 1, wherein the fixing member is a screw, and wherein the support member is fixed to the second frame with the screw in a state where the first frame is fixed to the second frame.

4. The fixing device according to claim 1, wherein the first frame is provided with a first hole, wherein the second frame is provided with a second hole, and wherein the support member includes a penetration member insertable into the first hole and the second hole in a state where the first frame is moved to and positioned at the second position, and the first hole and the second hole are positioned to face each other in a conveyance direction of the recording medium.

5. The fixing device according to claim 4, wherein, in a case where the first frame is at the first position and the penetration member is inserted into the second hole, the first frame is not allowed to be located at the second position.

6. The fixing device according to claim 4, wherein a direction in which the urging member urges the heating unit is identical to a direction in which the penetration member is inserted into the first hole and the second hole.

7. The fixing device according to claim 1, wherein the urging member includes a compression spring.

8. The fixing device according to claim 1, wherein the heating unit includes a rotatable endless fixing belt and a stay as a member forming the nip portion on an inner peripheral surface of the rotatable endless fixing belt, and wherein the urging member comes into contact with and urges the stay outside an area where the recording medium is in contact with the rotatable endless fixing belt in a width direction of the rotatable endless fixing belt.

9. The fixing device according to claim 1, wherein, in a state where the first frame is at the second position, the first frame is maintained at the second position by an own weight of the first frame.

10. The fixing device according to claim 1, further comprising a separation member configured to separate the recording medium and the heating unit on a downstream of the nip portion in a conveyance direction of the recording medium, wherein the separation member is configured to be not in contact with an area where the heating unit and the recording medium come into contact with each other.

11. The fixing device according to claim 1, wherein the fixing device is a belt heating type such that a rotatable endless fixing belt of the heating unit is heated by a heating roller of the heating unit.

12. The fixing device according to claim 1, wherein the first frame includes a cover that, at the second position, covers an upper side of the heating unit in a vertical direction of the heating unit.

13. The fixing device according to claim 1, further comprising a pressing member having the support member, where the support member includes a penetration member and the pressing member and the penetration member are separate members.

14. The fixing device according to claim 13, wherein the penetration member is fixed to the support member in an axial direction and the urging member is not fixed to the support member in the axial direction, wherein, when the pressing member is urged in a conveyance direction of the recording medium, the support member pushes a spring, and wherein, when a force greater than or equal to predetermined force is applied from the support member to the spring, the spring is compressed and urges the urging member to abut on the heating unit to position the heating unit.

* * * * *